United States Patent [19]
Morris, III

[11] Patent Number: 5,771,641
[45] Date of Patent: Jun. 30, 1998

[54] RODENT PEST INFESTATION PREVENTION ASSEMBLY

[76] Inventor: Bill Morris, III, 19624 Four Corners Rd., Bunker Hill, Kans. 67626

[21] Appl. No.: 667,077

[22] Filed: Jun. 20, 1996

[51] Int. Cl.⁶ .................................................. E04B 1/72
[52] U.S. Cl. ........................... 52/101; 49/58; 52/169.12; 52/DIG. 3; 119/469; 160/135; 256/1; 256/24
[58] Field of Search ................................ 52/169.12, 101, 52/DIG. 3, DIG. 11; 47/33; 40/124.14, 539, 606, 358, 607, 658, 761, 764; 49/58; 119/469, 470; 160/135, 352; 256/1, 24, 25, DIG. 6; 403/346, 347; 248/231.85, 315; 472/92, 126

[56] References Cited

U.S. PATENT DOCUMENTS

| | | |
|---|---|---|
| 425,890 | 4/1890 | Landis . |
| 778,688 | 12/1904 | Marsh ................................. 135/115 X |
| 817,508 | 4/1906 | Niele . |
| 1,727,779 | 9/1929 | Marengo . |
| 1,759,432 | 5/1930 | Brecht ................................... 40/764 X |
| 1,879,375 | 9/1932 | McElroy . |
| 1,980,453 | 11/1934 | Tucker et al. ............................. 40/764 |
| 1,991,312 | 2/1935 | Berger ................................... 40/539 X |
| 2,721,633 | 10/1955 | Keelor . |
| 2,797,896 | 7/1957 | Cook, II et al. . |
| 2,899,763 | 8/1959 | Jones, Sr. ................................. 40/606 |
| 3,111,303 | 11/1963 | Olson ................................... 40/607 X |
| 4,934,093 | 6/1990 | Yanna . |
| 4,969,289 | 11/1990 | Trifiletti . |
| 4,976,063 | 12/1990 | Young . |
| 5,010,669 | 4/1991 | Moran ...................................... 40/539 |
| 5,421,557 | 6/1995 | Vise ......................................... 256/24 |
| 5,595,230 | 1/1997 | Guerra ................................... 256/1 X |

FOREIGN PATENT DOCUMENTS

| | | |
|---|---|---|
| 2049509 | 2/1993 | Canada . |
| 8602881 | 6/1988 | Netherlands ............................... 256/1 |

*Primary Examiner*—Carl D. Friedman
*Assistant Examiner*—Timothy B. Kang
*Attorney, Agent, or Firm*—Flanagan & Flanagan; John R. Flanagan; John K. Flanagan

[57] ABSTRACT

A rodent pest infestation prevention assembly includes a wall for surrounding a predetermined area so as to enclose items, a plurality of top and bottom slits in the wall for making interlocking connection with one another for fastening end portions of the wall together so as to make the wall a substantially continuous structure about an item, and at least one holder member for maintaining the wall in an upright position. The wall may also have a plurality of spaced apart holes formed therein. At least one mateable bolt and nut combination are installed through aligned holes to secure overlapped end portions of the wall to one another and thereby serve the same function as the top and bottom slits of the wall. Each holder member has a base and a pair of elongated pegs. The base has a transverse groove and a pair of recessed holes on adjacent opposite sides of the groove. The groove is for receiving a bottom edge of the wall therein. Each recessed hole receives and retains a peg therein in a substantially upright position. The pegs together form a narrow space for receiving the wall therebetween in the upright position.

20 Claims, 1 Drawing Sheet

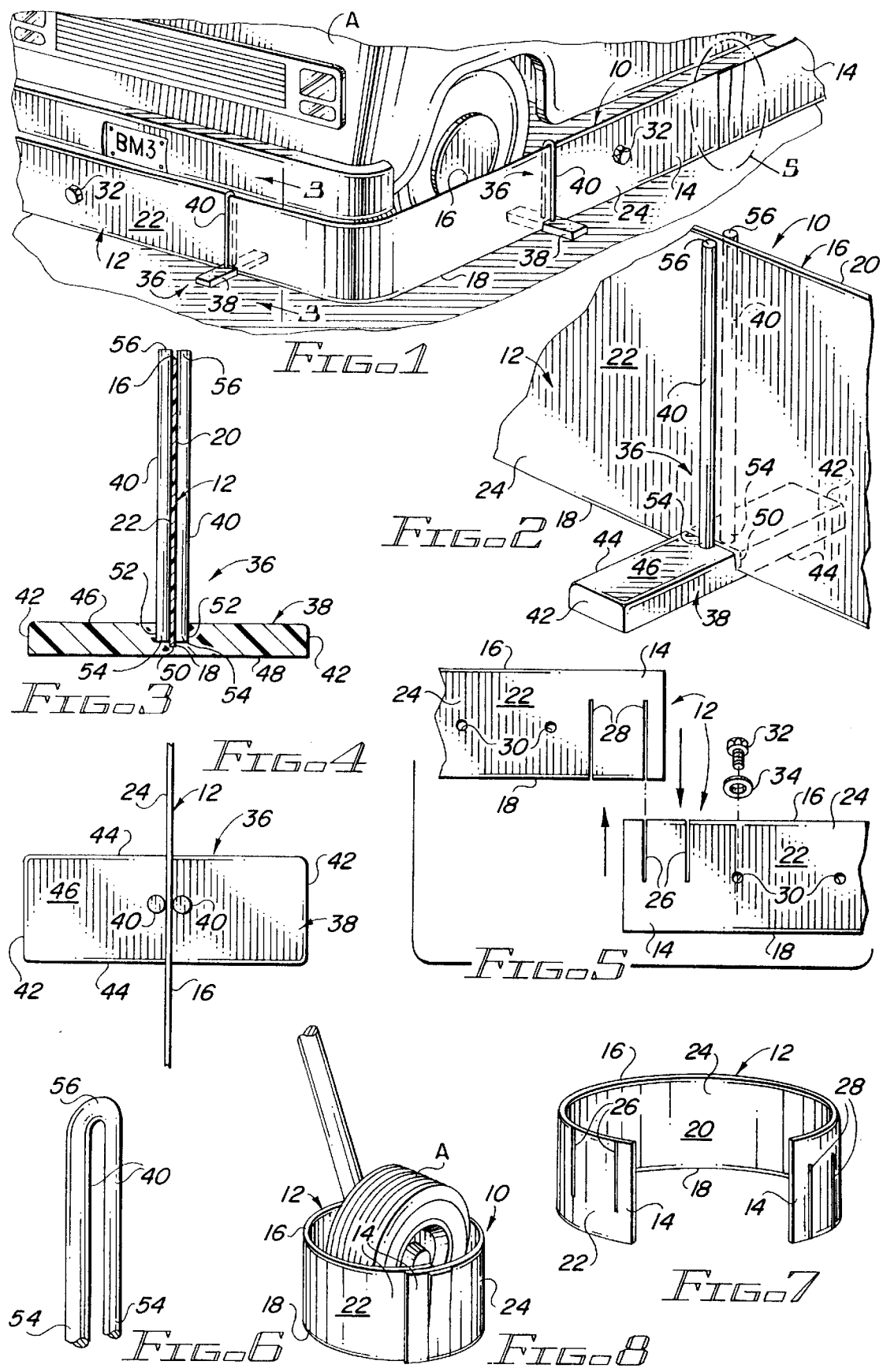

RODENT PEST INFESTATION PREVENTION ASSEMBLY

BACKGROUND OF THE INVENTION

1. Field of the Invention

The present invention generally relates to devices which protect against invasions of rodent pests and, more particularly, is concerned with a rodent pest infestation prevention assembly.

2. Description of the Prior Art

Rodent pests such as mice, rats and the like often invade areas or buildings where people keep items which are important to them. Rodent pests can cause damage to many of these items by biting, scratching and excreting waste matter. For this reason, it is generally desirable to have a means to protect items against infestations of these inconsiderate creatures. A variety of devices have therefore been developed over the years to serve this and other like purposes.

Representative examples of these and other related devices are disclosed in U.S. Pat. No. 425,890 to Landis, U.S. Pat. No. 817,508 to Niele, U.S. Pat. No. 1,727,779 to Marengo, U.S. Pat. No. 1,879,375 to McElroy, U.S. Pat. No. 2,721,633 to Keelor, U.S. Pat. No. 2,797,896 to Cook II, et al., U.S. Pat. No. 4,934,093 to Yanna, U.S. Pat. No. 4,969,289 to Trifiletti and U.S. Pat. No. 4,976,063 to Young. While these prior art devices appear to be satisfactory in use for the specific purposes for which they were designed, none of them appear to be adapted to provide an effective and compact and also comprehensive solution for the problem of rodent pest infestation.

Consequently, a need still exists for a device which provides a solution to the aforementioned problem in the prior art without introducing any new problems in place thereof.

SUMMARY OF THE INVENTION

The present invention provides a rodent pest infestation prevention assembly designed to satisfy the aforementioned need in the prior art. The rodent pest infestation prevention assembly of the present invention operates by surrounding and thereby providing a barrier which protects any of a variety of items against invasions of rodent pests such as mice, rats and the like. The rodent pest infestation prevention assembly particularly provides a user with an effective, compact and yet comprehensive solution for the problem of rodent pest infestation by preventing the rodent pests from reaching and thereby gaining access to the protected items.

Accordingly, the present invention is directed to a rodent pest infestation prevention assembly, comprising: (a) an elongated wall for surrounding a predetermined area and having a pair of opposite end portions, a pair of opposite top and bottom edges and a pair of opposite inner and outer surfaces; (b) means for fastening the opposite ends of the wall to one another so as to make the wall a substantially continuous structure extending about the predetermined area; and (c) means for maintaining the wall in an upright position.

More particularly, the wall is an elongated flexible flat strip comprised of a substantially plastic material and having any desired length depending upon the size of the predetermined area to be enclosed. The fastening means includes at least a pair and preferably a plurality of spaced apart top and bottom slits formed in the wall. The top slits are generally disposed closer to one of the opposite end portions of the wall and extend from the top edge interiorly through the wall and downwardly toward but spaced inwardly from the bottom edge of the wall. The bottom slits are generally disposed closer to the other of the opposite end portions of the wall and extend from the bottom edge interiorly through the wall and upwardly toward but spaced inwardly from the top edge of the wall. The opposite end portions of the wall are brought into an interlocked connected relationship with one another by intermeshing the end portions together at the locations of at least a selected one top slit and a selected one bottom slit of the wall such that the top and bottom edges of the wall are placed into a substantially flush relation with one another extending from one opposite end portion to the other opposite end portion of the wall and so that the opposite end portions of the wall overlap with one another.

The fastening wall may also include a plurality of spaced apart holes formed in the wall, preferably being disposed halfway between the top and bottom edges of the wall. By overlapping opposite end portions of the wall with one another selected pairs of holes in the wall are brought into alignment with one another. The fastening means may further include at least one and preferably a plurality of bolt and nut combinations with each bolt adapted to pass through a pair of aligned holes of the overlapped end portions of the wall and each nut adapted to mateably attach to a respective bolt so as to secure the overlapped end portions of the wall to one another.

The means for maintaining the wall in an upright position is at least one and preferably a plurality of holder members depending upon the size of the predetermined area to be enclosed. Each holder member includes a base and a pair of elongated pegs. The base includes a transverse groove and a pair of holes on adjacent opposite sides of the groove. The groove is adapted to receive the bottom edge of the wall therein. Each hole receives and retains a peg therein in a substantially upright position. The pegs together form a narrow space for receiving and holding the wall therebetween.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an outer perspective view of the rodent pest infestation prevention assembly of the present invention.

FIG. 2 is an enlarged fragmentary perspective view of the rodent pest infestation prevention assembly shown in FIG. 1.

FIG. 3 is an enlarged cross-sectional view of the assembly taken along line 3—3 of FIG. 1.

FIG. 4 is an enlarged fragmentary top plan view of the assembly shown in FIG. 1.

FIG. 5 is an exploded outer elevational view of the area of the assembly enclosed by circle 5 of FIG. 1.

FIG. 6 is an enlarged perspective view of one embodiment of a pair of elongated pegs of a holder member of the assembly.

FIG. 7 is an outer perspective view of a wall of the assembly in an opened condition.

FIG. 8 is an outer perspective view of the wall of the assembly in a closed condition.

DETAILED DESCRIPTION OF THE INVENTION

Referring to the drawings and particularly to FIGS. 1 and 8, there is illustrated a rodent pest infestation prevention assembly, generally designated 10, of the present invention, which operates by surrounding and thereby protecting any of a variety of items A against invasions of rodent pests such as mice, rats and other like animals. Basically, the infestation prevention assembly 10 includes a wall 12 for surrounding a predetermined area so as to enclose items A, means for fastening opposite end portions of the wall 12 to one another so as to make the wall 12 into a substantially continuous structure extending about the predetermined area, and means for maintaining the wall 12 in an upright position.

Referring now to FIGS. 1, 5, 7 and 8, the wall 12 of the assembly 10 has a pair of opposite end portions 14, a pair of opposite top and bottom edges 16, 18, and a pair of opposite inner and outer surfaces 20, 22. The wall 12 preferably is an elongated flexible flat strip 24 comprised of a substantially plastic material, but may be made of any other suitable material. The wall 12 has a height (or width) between the top and bottom edges 16, 18 greater than a thickness between the inner and outer surfaces 20, 22 thereof. The wall 12 may have any desired length depending upon the size of the predetermined area to be enclosed, but the length is greater than the height thereof. By way of example only, the wall can be provide in the form of a roll or strip of 6 to 10 inches wide plastic approximately ¹⁄₆₄ to ¼ inch thick and 50 to 60 inches in length.

In one embodiment seen in FIGS. 1, 5, 7 and 8, the fastening means of the assembly 10 includes a plurality of spaced apart top and bottom slits 26, 28 formed in the wall 12. The top slits 26 are generally disposed closer to one of the opposite end portions 14 of the wall 12 and extend from the top edge 16 interiorly through the wall 12 and downwardly toward but spaced inwardly from the bottom edge 18 of the wall 12. The bottom slits 28 are generally disposed closer to the other of the opposite end portions 14 of the wall 12 and extend from the bottom edge 18 interiorly through the wall 12 and upwardly toward but spaced inwardly from the top edge 16 of the wall 12. The top and bottom slits 26, 28 of the wall 12 each have the same length and each extend more than halfway between the top and bottom edges 16, 18 of the wall 12, but may extend any other suitable distance. The top and bottom slits 26, 28 preferably are spaced two feet apart, but may be spaced any other suitable distance apart from one another.

As shown in FIGS. 1, 5 and 8, the opposite end portions 14 of the wall 12 can be brought into an interlocked connected relationship with one another to provide the wall 12 in the form of a continuous structure. More particularly, the end portions 14 are brought into the interlocked connected relationship by intermeshing them together at the locations of selected ones of the top slits 26 of the wall 12 and selected ones of the bottom slit 28 of the wall 12 such that the top and bottom edges 16, 18 of the wall 12 are placed in a substantially flush relationship with one another extending from one opposite end portion 14 to the other opposite end portion 14 of the wall 12 and so that the opposite end portions 14 of the wall 12 overlap with one another.

In another embodiment shown in FIGS. 1, 5 and 7, the fastening means of the assembly 10 includes a plurality of spaced apart holes 30 formed in the wall 12 and a plurality of bolts 32 and nuts 34 threadably mateable with the bolts 32. Each hole 30 preferably is disposed halfway between the top and bottom edges 16, 18 of the wall 12, but may be disposed any other suitable distance from the top and bottom edges 16, 18. The holes 30 of the wall 12 preferably are spaced two feet apart, but may be spaced any other suitable distance apart from one another. Each hole 30 generally has a diameter just large enough for receiving the bolt 32 of a given appropriate size therethrough. By overlapping opposite end portions 14 of the wall 12 with one another selected pairs of the holes 30 in the wall 12 are brought into alignment with one another. The bolt 32 is adapted to be passed through a pair of aligned holes 30 of the wall 12 and the nut 34 is adapted to be mateable attached to the theaded end of the bolt 32 so as to secure the overlapped end portions 14 of the wall 12 to one another.

Referring now to FIGS. 1 to 4 and 6, the means of the assembly 10 for maintaining the wall 12 in an upright position is at least one and may be a plurality of holder members 36 depending upon the size of the predetermined area to be enclosed. Each holder member 36 includes a block-shaped base 38 and a pair of elongated pegs 40. The base 38 and the pegs 40 are each made of a substantially rigid material such as plastic or wood. The base 38 is substantially rectangular in shape and has a pair of opposite ends 42, a pair of opposite sides 44, a pair of opposite top and bottom surfaces 46, 48, and a transverse groove 50 and a pair of recessed holes 52 formed in the top surface 46. The recessed holes 52 are formed on opposite sides of the groove 50. The length of the base 38 from one opposite end 42 to the other opposite end 42 is greater than the width of the base 38 from one opposite side 44 to the other opposite side 44 thereof. The width from the one opposite side 44 to the other opposite side 44 is greater than the thickness of the base 38 from the top surface 46 to the bottom surface 48 thereof.

The groove 50 extends interiorly into the base 38 from the top surface 46 thereof toward, but terminates at a location spaced inwardly from, the bottom surface 48 thereof and extends through the base 38 from one opposite side 44 to the other opposite side 44 thereof. Further, the groove 50 particularly extends interiorly into the base 38 to a point closer to the bottom surface 48 than to the top surface 46 of the base 38, but may also extend interiorly any other suitable distance, so as to satisfactorily achieve the function of the groove 50, which is to receive the bottom edge 18 of the wall 12 therein.

The recessed holes 52, located on opposite sides of the groove 50, extend interiorly into the base 38 toward, but terminate at locations spaced inwardly from, the bottom surface 48 of the base 38. Also, the recessed holes 52 are located halfway between the opposite sides 44 of the base 38. The recessed holes 52 generally have a diameter and depth of sufficient sizes relative to the pegs 40 for receiving and retaining therein one of the pegs 40 in a substantially upright position. Each peg 40 has a pair of opposite first and second ends 54, 56. The first end 54 of each peg 40 is adapted for insertion into one of the recessed holes 52 of the base 38. The pairs of pegs 40 together form a narrow space for receiving and holding the wall 12 therebetween and face toward the inner and outer surfaces 20, 22 thereof. The pegs 40 are generally of the same length, although they need not be, and preferably are greater in height than the the wall 12, though need not be either. The second ends 56 of the pegs 40 may be separated, as shown particularly in FIGS. 2 and 3, or connected, as shown particularly in FIG. 6. If connected, the second ends 56 of the pegs 40 form an inverted U-shaped configuration for capturing the wall 12 therethrough in conjunction with the base 38.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A rodent pest infestation prevention assembly, comprising:
    (a) an elongated wall for surrounding a predetermined area and having a pair of opposite end portions, a pair of opposite top and bottom edges and a pair of opposite inner and outer surfaces;
    (b) means for fastening said opposite end portions of said wall to one another so as to make said wall a substantially continuous structure extending about the predetermined area; and
    (c) means for maintaining said wall in an upright position, said maintaining means being at least one holder member including a base having a pair of opposite side portions, a pair of opposite top and bottom surfaces and a transverse groove formed in said top surface extending interiorly into said base toward, but terminating at a location spaced above, said bottom surface and extending from one to another of said opposite side portions such that said groove is adapted to receive said bottom edge of said wall therein for maintaining said wall in said upright position surrounding said predetermined area.

2. The assembly of claim 1 wherein said wall is an elongated flat strip comprised of a substantially flexible material.

3. The assembly of claim 1 wherein said wall has a height extending between said top and bottom edges which is greater than a width extending between said inner and outer surfaces thereof.

4. The assembly of claim 1 wherein said fastening means includes at least a pair of spaced apart top and bottom slits formed therein, said top slit being disposed closer to one of said opposite end portions of said wall and extending from said top edge interiorly into said wall and downwardly toward but terminating at a location spaced inwardly from said bottom edge of said wall, said bottom slit being disposed closer to the other of said opposite ends of said wall and extending from said bottom edge interiorly into said wall and upwardly toward but terminating at a location spaced inwardly from said top edge of said wall.

5. The assembly of claim 4 wherein said top and bottom slits of said wall each have the same length.

6. The assembly of claim 4 wherein said top and bottom slits of said wall each extend more than halfway between said top and bottom edges of said wall.

7. The assembly of claim 1 wherein said fastening means includes a plurality of spaced apart holes formed in said wall.

8. The assembly of claim 7 wherein each of said holes is disposed about halfway between said top and bottom edges of said wall.

9. The assembly of claim 8 wherein said fastening means further includes at least one bolt and nut combination, said bolt being adapted to pass through aligned holes through overlapped end portions of said wall, said nut being adapted to mateably attach to said bolt so as to secure said overlapped end portions of said wall to one another.

10. A rodent pest infestation prevention assembly, comprising:
    (a) an elongated wall for surrounding a predetermined area and having a pair of opposite end portions, a pair of opposite top and bottom edges and a pair of opposite inner and outer surfaces;
    (b) means for fastening said opposite end portions of said wall to one another so as to make said wall a substantially continuous structure extending about the predetermined area; and
    (c) means for maintaining said wall in an upright position, said maintaining means being at least one holder member, said holder member including
        (i) a base having a pair of opposite ends, a pair of opposite sides, a pair of opposite top and bottom surfaces, and a pair of recessed holes formed in said top surface of said base extending interiorly into said base toward, but terminating at a location spaced inwardly from, said bottom surface of said base, and
        (ii) a pair of elongated pegs, each of said pegs having a pair of opposite first and second ends, said first end being adapted for insertion into one of said recessed holes of said base, said pegs together forming a narrow space for receiving and holding said wall therebetween.

11. The assembly of claim 10 wherein said holder member further includes a transverse groove formed in said top surface of said base between said holes and extending interiorly into said base toward, but terminating at a location spaced inwardly from, said bottom surface of said base and extending from one of said opposite sides to the other of said opposite sides of said base, said groove being adapted for receiving said bottom edge of said wall therein.

12. A rodent pest infestation prevention assembly, comprising:
    (a) an elongated wall for surrounding a predetermined area and having a pair of opposite end portions, a pair of opposite top and bottom edges, and a pair of opposite inner and outer surfaces;
    (b) means for fastening said opposite end portions of said wall to one another so as to make said wall a substantially continuous structure extending about the predetermined area, said fastening means including a plurality of spaced apart top and bottom slits formed in said wall, said top slits being disposed closer to one of said opposite end portions of said wall and extending from said top edge interiorly into said wall and downwardly toward but terminating at a location spaced inwardly from said bottom edge of said wall, said bottom slits being disposed closer to the other of said opposite end portions of said wall and extending from said bottom edge interiorly into said wall and upwardly toward but terminating at a location spaced inwardly from said top edge of said wall such that said opposite end portions of said wall can be brought into an interlocked connected relationship with one another by intermeshing the end portions together at the locations of at least a selected one of said top slits and a selected one of said bottom slits of said wall such that said top and bottom edges of said wall are placed into a substantially flush relation with one another extending from said one opposite end portion to said other opposite end portion of said wall and so that said opposite end portions of said wall overlap with one another; and
    (c) at least one holder member for maintaining said wall in an upright position, said holder member including a base having a pair of opposite ends, a pair of opposite sides, a pair of opposite top and bottom surfaces, a transverse groove formed in said top surface extending interiorly into said base toward, but terminating at a location spaced inwardly from, said bottom surface and extending from one of said opposite sides to the other of said opposite sides, said groove for receiving said bottom edge of said wall therein, and a pair of recessed holes formed in said top surface extending interiorly into said base toward, but terminating at a location spaced inwardly from, said bottom surface of said base and disposed on adjacent opposite sides of said groove between said opposite sides of said base, and a pair of elongated pegs, each of said pegs having a pair of opposite first and second ends, said first end being adapted for insertion into one of said recessed holes of said base, said pegs together forming a narrow space for receiving and holding said wall therebetween.

13. The assembly of claim 12 wherein said wall is an elongated flexible flat strip comprised of a substantially plastic material.

14. The assembly of claim 12 wherein said wall has a height extending between said top and bottom edges which is greater than a width extending between said inner and outer surfaces thereof.

15. The assembly of claim 12 wherein said top and bottom slits of said wall each have the same length.

16. The assembly of claim 12 wherein said top and bottom slits of said wall each extend more than halfway between said top and bottom edges of said wall.

17. The assembly of claim 12 wherein said pegs of said holder member are connected at said second ends so as to form an inverted U-shaped configuration for capturing said wall therethrough in conjunction with said base.

18. A rodent pest infestation prevention assembly, comprising:

(a) an elongated wall for surrounding a predetermined area and having a pair of opposite end portions, a pair of opposite top and bottom edges, and a pair of opposite inner and outer surfaces;

(b) means for fastening said opposite end portions of said wall to one another so as to make said wall a substantially continuous structure extending about the predetermined area, said fastening means including a plurality of spaced apart holes formed in said wall, each of said holes being disposed between said top and bottom edges of said wall and at least one mateable bolt and nut combination, said bolt being adapted for passage through aligned ones of said holes through overlapped end portions of said wall, said nut being adapted for mateable attachment to said bolt so as to secure said overlapped end portions of said wall to one another; and (c) at least one holder member for maintaining said wall in an upright position, said holder member including a base having a pair of opposite ends, a pair of opposite sides, a pair of opposite top and bottom surfaces, a transverse groove formed in said top surface extending interiorly into said base toward, but terminating at a location spaced inwardly from, said bottom surface and extending between said opposite sides of said base, said slot being adapted for receiving said bottom edge of said wall therein, and a pair of recessed holes formed in said top surface of said base extending interiorly into said base toward, but terminating at a location spaced inwardly from, said bottom surface of said base and disposed on adjacent opposite sides of said groove between said opposite sides of said base, and a pair of elongated pegs, each of said pegs having a pair of opposite first and second ends, said first end being adapted for insertion into one of said recessed holes of said base, said pegs together forming a narrow space for receiving and holding said wall therebetween.

19. The assembly of claim 18 wherein said wall is an elongated flexible flat strip comprised of a substantially plastic material.

20. The assembly of claim 18 wherein said wall has a height extending between said top and bottom edges which is greater than a thickness extending between said inner and outer surfaces thereof.

* * * * *